United States Patent [19]

Parker

[11] Patent Number: 4,922,242

[45] Date of Patent: May 1, 1990

[54] APPARATUS EXHIBITING PTC BEHAVIOR USEFUL FOR DISPLAYING INFORMATION

[75] Inventor: Robert Parker, Alamo, Calif.

[73] Assignee: Raychem Corporation, Menlo Park, Calif.

[21] Appl. No.: 119,618

[22] Filed: Nov. 12, 1987

[51] Int. Cl.⁵ .............................................. G09G 3/04
[52] U.S. Cl. .................................. 340/786; 340/713; 340/756; 350/351
[58] Field of Search ............... 340/786, 713, 714, 783, 340/756; 350/351

[56] References Cited

U.S. PATENT DOCUMENTS

| | | | |
|---|---|---|---|
| 3,354,565 | 11/1967 | Emmons et al. | 40/28 |
| 3,578,884 | 5/1971 | Churchill et al. | 350/160 |
| 3,600,060 | 8/1971 | Churchill et al. | 350/160 |
| 3,631,459 | 12/1971 | Morris, Jr. et al. | 340/786 |
| 3,877,008 | 4/1975 | Payne | 340/786 |
| 3,936,817 | 2/1976 | Levy et al. | 350/351 |
| 4,198,630 | 4/1980 | Serinken et al. | 350/351 |
| 4,472,026 | 9/1984 | Boyd et al. | 350/351 |
| 4,525,708 | 6/1985 | Hareng et al. | 340/713 |
| 4,598,978 | 7/1986 | Mourey et al. | 350/350 S |

FOREIGN PATENT DOCUMENTS 241247 10/1987 European Pat. Off. .

*Primary Examiner*—Gerald Brigance
*Attorney, Agent, or Firm*—Marguerite E. Gerstner; Timothy H. P. Richardson; Herbert G. Burkard

[57] ABSTRACT

An apparatus for displaying information comprising a resistive element, preferably a conductive polymer resistive element, adjacent to a thermochromic layer. When electrically powered, the resistive element heats the thermochromic layer above a transition point causing the thermochromic layer to change from opaque to transparent. The resistive element exhibits PTC behavior and, therefore, does not overheat. The apparatus may be large in size and on a flexible substrate.

23 Claims, 2 Drawing Sheets

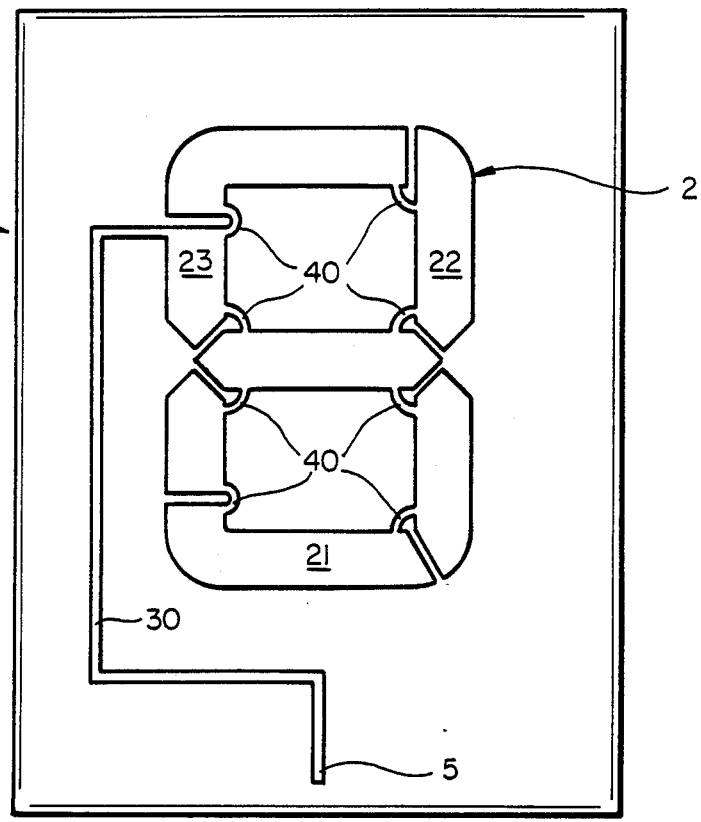
FIG_1a
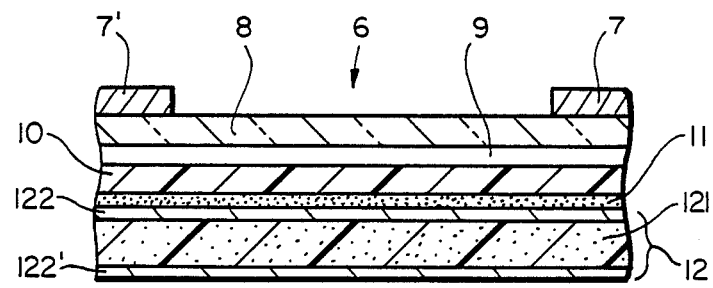
FIG_2

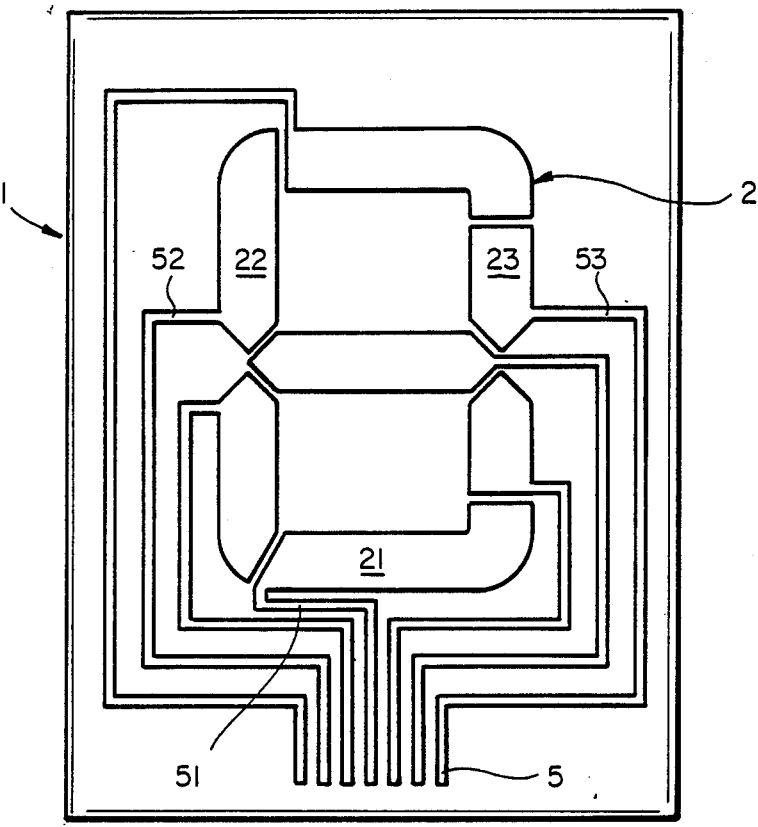
FIG_1b
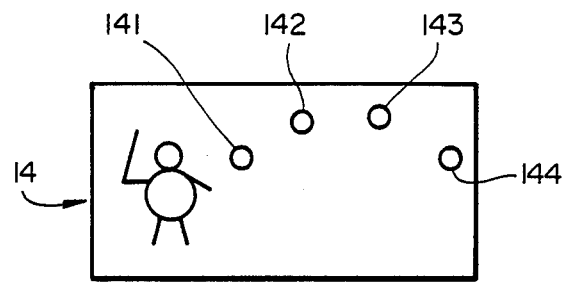
FIG_3

APPARATUS EXHIBITING PTC BEHAVIOR USEFUL FOR DISPLAYING INFORMATION

BACKGROUND OF THE INVENTION

Field of the Invention

This invention relates to the use of thermochromic materials in an apparatus for displaying information.

INTRODUCTION TO THE INVENTION

Signs for the display of highway information, advertising, and athletic scores are well-known. Simple signs, such as for gas prices or movie marquees, are generally rugged and inexpensive, but require manual change (e.g. by physically exchanging one number or word for another) when the information is no longer correct. More elaborate electronic signs use light bulbs or "flip dots" that are remotely controlled. Although the information is easily changed, the signs are expensive and require relatively intricate electronic connections. Other types of signs, based on LEDs (light emitting diodes) or LCDs (liquid crystal displays), are suitable for small, protected environments, but are not generally used outdoors due to their relatively low level of brightness, low contrast in bright sunlight, small display size, and need for protection from the elements. Many liquid crystal displays have been prepared by applying a liquid crystal material onto a conductive electrode element, such as those described in U.S. Pat. Nos. 3,578,844 and 3,600,060 (Churchill, et al.). Such electrodes are used to generate an electric field across the liquid crystal layer and require complex electroding arrangements.

Another type of display is that which uses a reversible thermochromic material, i.e. one that changes color upon exposure to a temperature above a transition point. U.S. Pat. No. 3,354,565 (Emmons, et al.) describes the use of such a material to produce a passive information display. A metal iodide or metal bromide thermochromic material is deposited over an array of thin resistors positioned on an alumina substrate. The resistors are formed of barium titanate, a material exhibiting a positive temperature coefficient of resistance (PTC behavior). They are connected by suitable electrodes so that when power is applied to selected elements, specific resistors heat up above the transition point of the thermochromic material, causing it to change color and display information. The PTC effect prevents the resistors from overheating and damaging the display.

Conductive polymer compositions exhibiting PTC behavior, and electrical devices comprising them, are well known. Particularly useful conductive polymer compositions are those described in U.S. Pat. Nos. 3,861,029, 3,823,217, 4,560,498, 4,177,376, 4,330,703, 4,543,474, 4,654,511, 4,188,276, 4,534,889, 4,388,607, 4,304,987, 4,237,441, 4,238,812, 4,329,726, 4,591,700, 4,426,633, and 4,514,620, and in copending commonly assigned U.S. application Ser. Nos. 141,989, 656,046 now abandoned in favor of a file wrapper continuation Ser. No. 146,460 (Jan. 21, 1988), 423,589, 818,845 now abandoned, 818,846 now abandoned, and 75,929. The disclosure of each of these patents and pending applications is incorporated herein by reference.

Displays comprising ceramic resistors such as barium titanate are subject to a number of problems. Such resistors are brittle and difficult to form or machine into intricate shapes or large sizes. They may be subject to cracking under high electrical or thermal stresses, particularly when exposed to overcurrent conditions. The resistors are difficult to manufacture into very thin elements, limiting the rate of thermal transfer to the thermochromic material. There is generally a mismatch in thermal coefficients of expansion between the ceramic and the thermochromic, which can result in cracking or delamination of the thermochromic from the ceramic resistor with use. In addition, such displays require a complex lead attachment arrangement to connect the resistors to electrical power. Hot spots can develop at the site of the lead attachment, producing a nonuniform display.

SUMMARY OF THE INVENTION

I have now discovered that by the use of a resistive heating element in which the direction of current flow is at least in part perpendicular to the surface of the heating element, an apparatus for displaying information can be provided that has a uniform and reproducible display, and can be made in large sizes, with simplified electroding, flexible substrates, and complex patterns. In one aspect this invention provides an electrically controlled apparatus for displaying information which comprises (1) a resistive element at least a part of which exhibits PTC behavior with a switching temperature, $T_s$, and which has a first surface and a second surface;

(2) a first electrode attached to the first surface of the resistive element;

(3) a plurality of second electrodes which are attached to the second surface of the resistive element and which are not electrically connected to each other on said second surface;

(4) a first electrical lead which is connected to the first electrode and can be connected to a power supply;

(5) a plurality of second electrical leads each of which is connected to one of the second electrodes and can be connected to a power supply so that, when the first electrical lead and at least one selected second electrical lead are connected to a suitable power supply current flows through the resistive element and thus selectively generates heat therein in a pattern which is determined by the selection of the second electrical leads.

In its second aspect, this invention provides an electrically controlled display apparatus comprising more than one segment, each segment comprising (1) a resistive element at least a part of which exhibits PTC behavior with a switching temperature, $T_s$, and which has a first surface and a second surface;

(2) a first electrode attached to the first surface of the resistive element;

(3) a plurality of second electrodes which are attached to the second surface of the resistive element and which are not electrically connected to each other on said second surface; and (4) a thermochromic material with an indicating temperature, $T_i$, adjacent the surface of the first electrode, wherein the thermochromic material of a first segment has a different indicating temperature than the thermochromic material of a second segment.

In a third aspect, the invention provides an apparatus for displaying information comprising (1) a mask having a pattern cut therethrough;

(2) a transparent substrate having a first and a second surface, the first surface placed adjacent to the mask;

(3) a thermochromic layer applied to the second surface of substrate; and
(4) a plurality of laminar resistive elements which
   i. comprise at least two laminar electrodes such that when the electrodes are electrically connected the direction of current flow is perpendicular to the surface of the resistive element,
   ii. correspond to the pattern of the mask, and
   iii. are placed adjacent to the thermochromic layer.

In a fourth aspect, the invention provides an electrically controlled display apparatus which comprises
(1) a laminar resistive element at least a part of which exhibits PTC behavior and which has a first and a second surface;
(2) a first electrode attached to the first surface of the resistive element;
(3) a second electrode attached to the second surface of the resistive element;
(4) a first electrical lead which is connected to the first electrode and can be connected to a power supply;
(5) a second electrical lead which is connected to the second electrode and can be connected to a power supply, so that when the first electrical lead and the second electrical lead are connected to a suitable power supply, current flows through the resistive element and thus selectively generates heat therein in a pattern conforming to the shape of the second electrodes; and
(6) a thermochromic material which undergoes a reversible and visually observable change in response to said selective generation of heat in the resistive element.

In a fifth aspect, the invention provides an electrically controlled display apparatus which comprises
(1) a backplane which comprises a plurality of electrically conductive traces on one surface, said traces being connectable to a source of electrical power; and
(2) a plurality of panels which can be electrically attached to said surface of the backplane, each panel comprising
   (a) a resistive element at least a part of which exhibits PTC behavior with a switching temperature, $T_s$, and which has a first surface and a second surface;
   (b) a first electrode attached to the first surface of the resistive element;
   (c) a plurality of second electrodes which are attached to the second surface of the resistive element and which are not electrically connected to each other on said second surface;
   (d) a first electrical lead which is connected to the first electrode and can be connected to the traces of the backplane;
   (e) a plurality of second electrical leads each of which is connected to one of the second electrodes and can be connected to a power supply so that, when the traces of the backplane and at least one selected second electrical lead are connected to a suitable power supply, current flows through the resistive element and thus selectively generates heat therein in a pattern which is determined by the selection of the second electrical leads; and
   (f) thermochromic material which undergoes a reversible and visually observable change in response to said selective generation of heat in the resistive element.

BRIEF DESCRIPTION OF THE DRAWING

The invention is illustrated in the accompanying drawing in which

FIGS. 1a and 1b are plan views of the front and back sides of a resistive element section of one aspect of the invention, FIG. 2 is a cross-sectional view of an apparatus of the invention, and FIG. 3 is a front view of third embodiment of an apparatus of the invention.

DETAILED DESCRIPTION OF THE INVENTION

The resistive element of the invention described herein may be a ceramic material but is preferably a conductive polymer element which is composed of a polymeric component and, dispersed in the polymeric component, a particulate conductive filler. The polymeric component is preferably a crystalline organic polymer or blend comprising at least one crystalline organic polymer, such term being used to include siloxanes. The conductive filler may be graphite, carbon black, metal, metal oxide, or a combination of these. Particularly preferred compositions comprise a continuous matrix comprising a first organic polymer, and a first particulate conductive filler which is distributed in the matrix and maintains its identity therein, and each particle of which comprises a second organic polymer, and a second particulate conductive filler which is distributed in the second polymer. Such compositions are described in U.S. application Ser. Nos. 818,845, 818,846, and 75,929. The conductive polymer element may also comprise antioxidants, inert fillers, prorads, stabilizers, dispersing agents, or other components. Dispersion of the conductive filler and other components may be achieved by dry-blending, melt-processing or sintering.

The resistive element may be cross-linked by chemical means or irradiation. It may comprise more than one layer of material.

The resistive element may be of any shape, e.g. flat or tubular, but laminar resistive elements are preferred.

The resistive element exhibits PTC behavior with a switching temperature, $T_s$, defined as the temperature at the intersection of the lines drawn tangent to the relatively flat portion of the log resistivity vs. temperature curve below the melting point and the steep portion of the curve. Suitable compositions are disclosed in the references cited. If the resistive element comprises more than one layer, the composite layers of the element must exhibit PTC behavior.

The resistive element has electrodes which are electrically connected to both a first and a second surface of the PTC element. The electrodes are connectable to a source of electrical power to cause current to pass through the PTC element in a direction which is, at least in part, perpendicular to the surfaces. The electrodes may be metal foil electrodes formed by sputtering or flame-spraying, or attached via lamination. They may also comprise a paint which is applied by such techniques as screen-printing. The electrode on at least one surface of the resistive element may comprise a plurality of parallel strips which are connected at one edge by a bussbar. Particularly preferred are metal foil electrodes of nickel or copper with an electrodeposited layer which has a microrough surface. The electrodes are often applied to the entire surface of both sides of the resistive element and then etched or die-cut to produce the desired pattern for the display (e.g. a number, letter, or dot matrix). Alternatively, they may be screen-printed or sputtered directly onto the surface in the desired pattern. The pattern may be solid or segmented, such as the seven segments commonly used to make the numeral 8. For ease in making electrical connection to the resistive element, it is preferred that one electrode maintain a common or continuous electrical connection between the segments, if any, of the pattern. The second electrode may then be separated into a plurality of segments conforming to the segments of the pattern, each of which has individual electrical connections and which may be individually powered to allow different sections of the pattern to be displayed. A display may comprise several discrete patterns, each comprising individual segments. In such a segmented display, a different thermochromic material and/or different resistive element may be used for each pattern in order to provide different colors or different displays at differing temperatures or times.

The thermochromic material may be inorganic, such as mercuric oxide, mercuric iodide, or cuprous iodide, or organic, e.g. a polymer or liquid crystal. Particularly preferred are reversible thermochromic materials of the type described in U.S. application Ser. Nos. 849,223 and 905,808 both now abandoned, published as European patent publication No. 241,247 (Oct. 14, 1987). These materials comprise a transparent, flexible matrix material, such as a silicone, and an indicating material dispersed within the matrix material. The indicating material may be a particulate wax or other polymer. Particularly preferred are particulate waxes with a particle size between about 2 and about 50 microns. The indicating temperature, $T_i$, i.e. the melting temperature or transition temperature of the particulate wax dispersed in the matrix material, is generally at least 10 to 20 degrees C. below the switching temperature of the laminar resistive element. At the transition temperature, this thermochromic changes from opaque white to transparent, allowing exposure of pigmented layers beneath.

The thermochromic material may be applied to the resistive element by any means that produces a uniform layer. Such means include screen-printing, knife-coating, and spraying. Alternatively, the thermochromic material may be applied to a substrate such as a transparent polymer layer of silicone or polycarbonate which can then be laminated or adhesively attached to the resistive element.

In some embodiments of the invention a metal mask is used to provide a rigid frame for the display and to minimize the effects of differential thermal expansion between the layers. The mask is generally cut in a shape comparable to, but with dimensions slightly smaller than, that of the pattern in order to provide a distinct border to enhance the sharpness of the display. The mask may be cut with tabs protruding from various locations around the perimeter of the pattern. These tabs, when bent around the layers comprising the apparatus, can act as both a means of holding the pattern segments in position by pressure, and a source of electrical connection. Wires or other conductive means may be attached to the second surface of the resistive element by the pressure of the tabs. They may then be connected to a source of electrical power when the apparatus is in use.

For ease in fabrication, the metal mask may be die-cut into the desired pattern. The insulating layer, the thermochromic layer and the resistive element may be stacked together and simultaneously die-cut. The second electrode may then be etched or cut to separate it into a plurality of electrodes, each comprising one segment of the desired pattern.

The apparatus frequently comprises an insulating layer for electrical insulation and environmental protection. This is particularly important when the display is used outdoors in order to prevent rain or snow from affecting the thermochromic material or electrical connections. In some cases, the wax component of the thermochromic material may migrate. The insulating layer minimizes this diffusion. If the apparatus does not comprise a metal mask, the insulating layer is usually the top surface layer. When the embodiment includes a metal mask, the insulating layer comprises the layer directly under the metal mask, and covers the thermochromic material. This layer is preferably a transparent polymeric layer such as polycarbonate or silicone. Silicone is particularly preferred because it has an index of refraction less than that of most plastics and thus produces less glare. In addition, it conforms well to the metal mask or other surface layer, is chemically stable, and allows a good bond between adjacent pigmented or thermochromic material layers based on silicone.

Additional layers of adhesive or pigment may be used as part of the apparatus. Pigment may be dispersed in adhesive or silicone or other materials to modify the background appearance or the color of the display. Pigmented masks may be used to provide a sharper image, use less power in the display, use less thermochromic material, or to enhance the adhesion between adjacent layers. If no pigmented layer is used, the display normally appears white. When powered, the pattern appears black on a white background. A pigmented layer may be used between the resistive element and the thermochromic layer. For example, if a red pigmented layer is used, the powered pattern will be red on a white background If a black paint mask is used between the insulating layer and the thermochromic layer, the display will be white on a black background. In use, only those segments not needed in the design will be powered. For instance, in a 7-segment numeral 8 pattern, an unpowered display will show an 8. A 1 will be shown by powering 5 segments, a 2, 3, 5, 6, or 9 will be shown by powering 2 segments, and a 0 will be shown by powering 1 segment. For all cases except the number 1, fewer segments are powered than for black numbers on a white background.

In other embodiments, the apparatus of the invention may comprise timing mechanisms such as clocks or bimetallic switches used to turn the display on or off at appropriate times. These timing mechanisms are particularly useful for blanking signs, i.e. signs which display a single message at specified times or under specified conditions but remain blank or opaque at other times. For these signs, the first electrode and the second electrode are frequently the same pattern because only a single message is displayed. A single first and a single second electrical lead are required so that when they are connected to a suitable power supply, current flows through the resistive element and thus selectively generates heat therein in a pattern used to display the message. The use of a reversible thermochromic material allows repetitive display of the information.

For some embodiments it is possible to provide a backplane inscribed with a plurality of electrical traces onto which panels comprising a resistive element with first and second electrodes and a thermochromic material can be deposited. Such an apparatus allows easy modification of the display by changing the panels but leaving the backplane, which can be connected to a source of electrical power, intact. In its most simple version, such a display could be used for a dot matrix pattern.

The invention is illustrated by FIGS. 1-3. FIGS. 1a and 1b show two different sides of a laminar resistive element 1 with a pattern 2 screen-printed or etched onto the surface of the resistive element. FIG. 1a illustrates the side of the pattern with a common plane for electrical connection. The segments of the pattern 21,22,23 are each connected to an adjacent segment via an electrically conductive connection 40. The common electrical connection 30 extends from one segment, in this drawing segment 23, to a position 5 where the electrical connection 30 can be attached to a source of electrical power.

FIG. 1b illustrates the pattern 2 on the opposite side of the resistive element 1. Segments 21,22,23 are not electrically connected to one another. Each has a separate electrical connection means, e.g. 51,52,53, attached to the segment and extending to a position 5 where each electrical connection means can be attached to source of electrical power.

FIG. 2 is a cross-sectional view of one embodiment of the invention. The apparatus 6 comprises a metal mask 7,7' on top of a transparent polymeric layer 8, frequently made of silicone or polycarbonate. The polymeric layer 8 is adjacent to the thermochromic layer 9 which is shown in this embodiment to be on top of a pigmented layer 10 of carbon blackfilled silicone. This layer is attached via an adhesive layer 11 to the laminar resistive element 12. The laminar resistive element comprises two electrodeposited copper foil electrodes 122,122' on either side of a laminar conductive polymer element 121.

FIG. 3 is a front view of a display 14 used as a point of purchase display. The display comprises individual segments 141,142,143,144 each of which appears different in the display. The segments may comprise layers comprising different thermochromic materials with different transition temperatures, layers comprising different pigmented materials, or resistive elements with different switching temperatures that are used to "trigger" different thermochromic layers.

Examples of the invention were prepared in the following way.

EXAMPLE 1

A PTC conductive polymer sheet was made by extruding a blend of 32.5 wt % high density polyethylene powder (FA750, available from U.S.I. Chemicals) and 67.5 wt % PTC particulates into a 0.030 inch thick sheet. The PTC particulates had been prepared by melt-blending 56 wt % high density polyethylene (Marlex 50100, available from Phillips Petroleum) with 43 wt % carbon black (Statex G, available from Columbian Chemicals) and 1 wt % antioxidant (Ferroant, available from Raychem) prior to extrusion into strands, irradiation to a dose of 60 Mrad, and cryogenic grinding to a size of less than 250 microns. Electrodeposited copper foil passivated with nickel and zinc (Yates Inc.) was laminated to both sides of the conductive polymer sheet. The resulting sheet had a surface temperature of about 95 degrees C. when electroded and powered at 110 VAC. A pattern of the numeral 8 comprising seven individual but connected segments was die cut from the electroded sheet. The metal foil attaching the individual segments was removed from one side of the conductive polymer sheet.

A reversible thermochromic material was prepared by blending 31.3 wt % of a micronized paraffin wax (Mekon White, available from Petrolite Specialty Polymers Group) with 68.7 wt % of of a two part silicone resin (62.5 wt % of part A and 6.2 wt % of part B of Sylgard 184, available from Dow Corning). The material, which had a melting temperature of 82 degrees C., was silk-screened or knife-coated onto the surface of a transparent silicone sheet. The thermochromic layer was then covered by a first layer of carbon blackfilled silicone and by a second layer of a transparent epoxy adhesive.

The display was assembled by attaching the silicone sheet to a metal mask which was die cut to show the seven individual segments of the numeral 8 in a size slightly smaller than that of the conductive polymer numeral 8 segments. The conductive polymer numeral 8 was attached to the assembly in a registered position over the openings of the metal mask and was held in place by both the transparent epoxy adhesive and by tabs at the edge of each segment of the metal mask.

Electrical connections were made to the display by attaching wires under the tabs of each individual segment and a common wire to the electrode surface on the conductive polymer sheet that was not separated into individual segments. When the assembly was powered at 110 VAC, the numeral 8 was visible within about 30 to 60 seconds. This display was reproducible when the power was cycled on and off.

EXAMPLE 2

A PTC conductive polymer sheet without electrodeposited foil electrodes was made as in Example 1. A resistor pattern comprising the seven individual segments of the numeral 8 and suitable electrode connections between them (FIG. 1) was positioned on one side of the extruded PTC sheet either by screen-printing silver ink (Dupont 5008) or by selectively etching 0.25 oz copper into the desired pattern. A similar pattern comprising seven connected segments and a narrow silver or copper busbar attached to the pattern was etched, in a registered position to the first pattern, on the opposite side.

The reversible thermochromic material of Example 1 was silk-screened onto the surface of the conductive polymer sheet on the side opposite to the first etched or screen-printed electrode pattern. The thermochromic layer was covered with a thin layer of a transparent epoxy which acted as a tie layer to a polycarbonate surface sheet intended for environmental protection. In some embodiments of the invention dye was added to the transparent epoxy layer to provide a colored display; in other embodiments, a pigmented adhesive layer was inserted between the PTC sheet and the thermochromic layer. When electrical connections were made to the display, and it was powered at 110 VAC, the numeral 8 was visible within about 30 to 60 seconds. This display was reproducible when the power was cycled on and off.

What is claimed is:

1. An electrically controlled display apparatus suitable for generating heat in a selected pattern in order to display information, said apparatus comprising (1) a resistive element at least a part of which exhibits PTC behavior with a switching temperature, $T_S$, and which has a first surface and second surface;

(2) a first electrode attached to the first surface of the resistive element;

(3) a plurality of second electrodes which are attached to the second surface of the resistive element and which are not electrically connected to each other on said second surface;

(4) a first electrical lead which is connected to the first electrode and can be connected to a power supply; and (5) a plurality of second electrical leads each of which is connected to one of the second electrodes and can be connected to a power supply so that, when the first electrical lead and at least one selected second electrical lead are connected to a suitable power, supply, current flows through the resistive element and thus selectively generates heat therein in a pattern which (a) is determined by the selection of the second electrical leads and (b) is used to display information.

2. An apparatus according to claim 1 which further comprises (6) thermochromic material which undergoes a reversible and visually observable change in response to said selective generation of heat in the resistive element.

3. An apparatus according to claim 2 which further comprises (7) an insulating layer which is adjacent the surface of the thermochromic material and is remote from the resistive element.

4. An apparatus according to claim 1 wherein the resistive element comprises a laminar resistive element.

5. An apparatus according to claim 1 wherein the resistive element comprises a conductive polymer.

6. An apparatus according to claim 5 wherein the conductive polymer comprises i. a continuous matrix comprising a first organic polymer, and ii. a first particulate conductive filler which is distributed in the matrix and maintains its identity therein, and each particle of which comprises (a) a second organic polymer, and (b) a second particulate conductive filler which is distributed in the second polymer.

7. An apparatus according to claim 2 wherein the thermochromic material comprises a transparent, flexible matrix material and an indicating material dispersed within the matrix material.

8. An apparatus according to claim 7 wherein the matrix material is a silicone resin.

9. An apparatus according to claim 7 wherein the indicating material is a polymer.

10. An apparatus according to claim 7 wherein the indicating material is a wax.

11. An apparatus according to claim 7 wherein the indicating material (a) is particulate and (b) has a particle size between about 2 and about 50 microns.

12. An apparatus according to claim 7 wherein the indicating material has a phase transition at least 10 degrees C. below $T_S$ of the resistive element.

13. An apparatus according to claim 1 wherein the resistive element is laminar, the first electrode is in the form of a first pattern on the first surface of the resistive element, and the second electrodes together form a pattern which is similar to the first pattern but has gaps between the second electrodes and which is positioned on the second surface of the resistive element opposite to the first pattern.

14. An apparatus according to claim 1 wherein the first and second electrodes (i) are copper, and (ii) have been applied by a process which comprises etching.

15. An apparatus according to claim 1 wherein the first and second electrodes (i) are silver, and (ii) have been applied by a process which comprises screen printing.

16. An apparatus according to claim 2 which comprises a pigmented adhesive layer which lies between the first electrode and the thermochromic material.

17. An apparatus according to claim 13 wherein the second electrically conductive pattern comprises an alpha numeric display pattern.

18. An apparatus according to claim 3 wherein a paint mask of substantially the same shape but slightly smaller size than the first electrode lies between the insulating layer and the first electrode.

19. An electrically controlled display apparatus comprising a plurality of segments, each segment comprising (1) a resistive element at least a part of which exhibits PTC behavior with a switching temperature, $T_S$, and which has a first surface and a second surface;

(2) a first electrode attached to the first surface of the resistive element;

(3) a plurality of second electrodes which are attached to the second surface of the resistive element and which are not electrically connected to each other on said second surface; and (4) a thermochromic material having an indicating temperature $T_i$ at which it undergoes a visually observable change when it is heated from room temperature to a temperature above $T_i$ and which is positioned adjacent the surface of the first electrode, wherein the thermochromic material comprised by a first segment has a different indicating temperature than the thermochromic material comprised by a second segment.

20. An apparatus for displaying information comprising (1) a mask having a pattern cut therethrough;

(2) a transparent substrate having a first and a second surface, the first surface placed adjacent to the mask;

(3) a thermochromic layer applied to the second surface of substrate; and (4) a plurality of laminar resistive elements which i. comprise at least two laminar electrodes such that when the electrodes are electrically connected the direction of current flow is perpendicular to the surface of the resistive element, ii. correspond to the pattern of the mask, and iii. are placed adjacent to the thermochromic layer.

21. An apparatus according to claim 20 wherein said mask, thermochromic layer, and resistive elements have been die-cut.

22. An electrically controlled display apparatus which comprises (1) a laminar resistive element at least a part of which exhibits PTC behavior and which has a first and a second surface;

(2) a first electrode attached to the first surface of the resistive element;

(3) a second electrode attached to the second surface of the resistive element;
(4) a first electrical lead which is connected to the first electrode and can be connected to a power supply;
(5) a second electrical lead which is connected to the second electrode and can be connected to a power supply, so that when the first electrical lead and the second electrical lead are connected to a suitable power supply, current flows through the resistive element and thus selectively generates heat therein in a pattern conforming to the shape of the second electrode; and
(6) a thermochromic material which undergoes a reversible and visually observable change in response to said selective generation of heat in the resistive element.

23. An electrically controlled apparatus suitable for displaying information in a selected pattern, said apparatus comprising
(1) a backplane which comprises a plurality of electrically conductive traces on one surface, said traces being connectable to a source of electrical power; and
(2) a plurality of panels which can be electrically attached to said surface of the backplane, each panel comprising (a) a resistive element at least a part of which exhibits PTC behavior with a switching temperature, $T_s$, and which has a first surface and a second surface;
(b) a first electrode attached to the first surface of the resistive element;
(c) a plurality of second electrodes which are attached to the second surface of the resistive element and which are not electrically connected to each other on said second surface;
(d) a first electrical lead which is connected to the first electrode and can be connected to the traces of the backplane;
(e) a plurality of second electrical leads each of which is connected to one of the second electrodes and can be connected to a power supply so that, when the traces of the backplane and at least one selected second electrical lead are connected to a suitable power supply, current flows through the resistive element and thus selectively generates heat therein in a pattern which is determined by the selection of the second electrical leads; and
(f) thermochromic material which undergoes a reversible and visually observable change in response to said selective generation of heat in the resistive element.

* * * * *